UNITED STATES PATENT OFFICE.

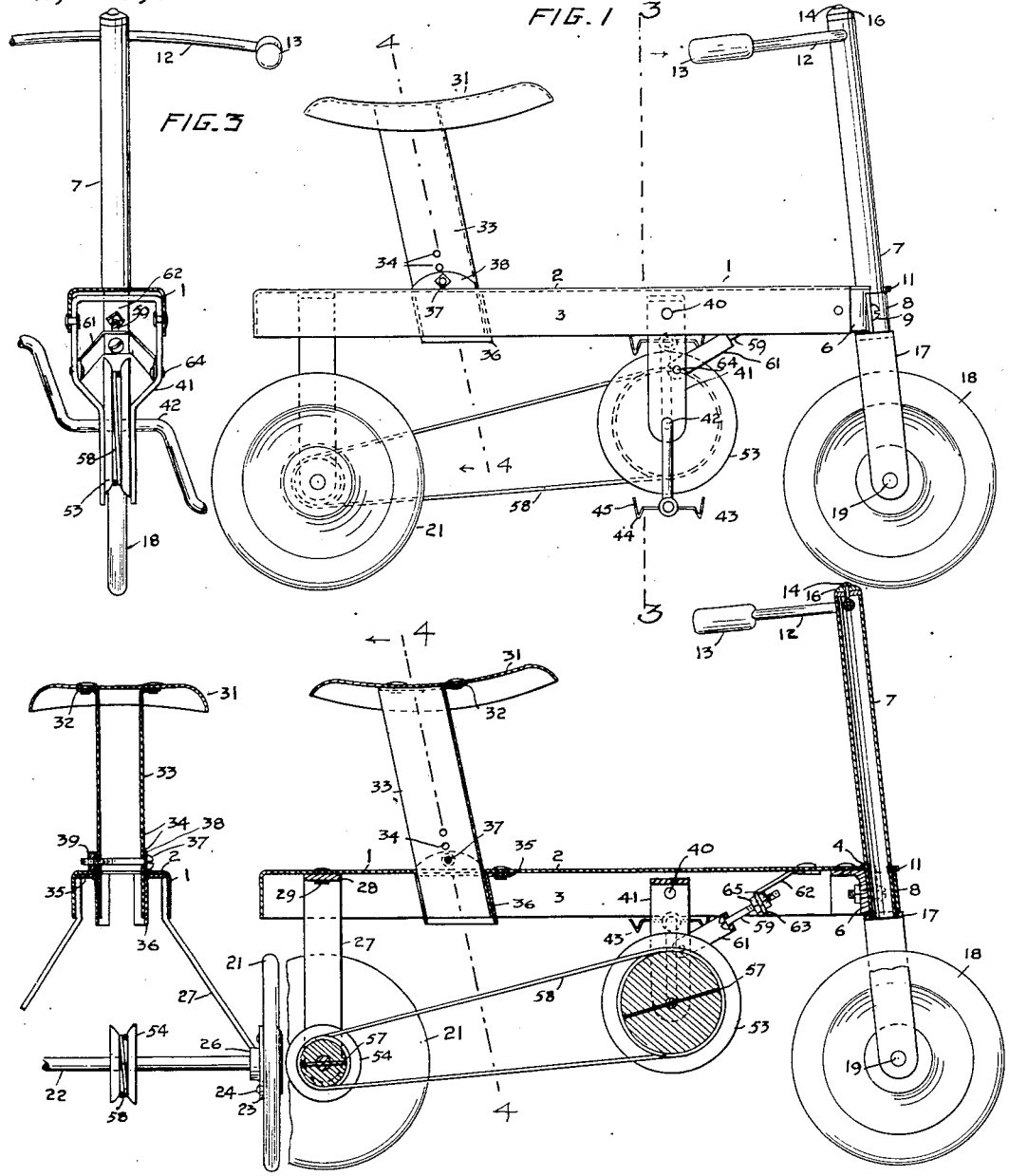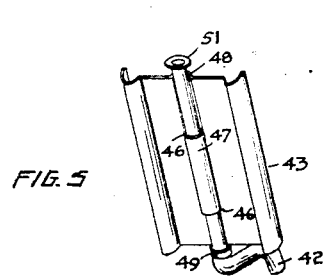

GEORG EKLUND, OF BERKELEY, CALIFORNIA.

CHILD'S VELOCIPEDE.

1,387,771.     Specification of Letters Patent.     Patented Aug. 16, 1921.

Application filed April 2, 1919. Serial No. 287,028.

*To all whom it may concern:*

Be it known that I, GEORG EKLUND, a citizen of the United States, residing at Berkeley, in the county of Alameda and State of California, have invented new and useful Improvements in Children's Velocipedes, of which the following is a specification.

The present invention relates to improvements in velocipedes for the use of small children, the object of the invention being to provide a velocipede which will be durable and which will be very simple and inexpensive in construction and capable of being put on the market at a low price.

In the accompanying drawing, Figure 1 is a side view of the velocipede; Fig. 2 is a longitudinal vertical section of the same; Fig. 3 is a cross sectional view on the line 3—3 of Fig. 1; Fig. 4 is a cross sectional view on the line 4—4 of Fig. 1; and Fig. 5 is a detailed perspective of one of the treadles.

Referring to the drawing, 1 indicates the main body of the velocipede, formed of sheet metal bent into a channel shape, having a horizontal portion 2 and depending sides 3, the rear end of said horizontal portion 2 being rounded, and the sides 3 being also continued in a rounded form at the rear end of the body to correspond with the rounded rear end of the portion 2. The front end of the upper horizontal portion 2 is also rounded but has a central concavity 4 and the front end of the channel body is closed by a rounded member 6, the ends of which are spot-welded to the front portions of the sides 3 of the body, while the central portion of said member 6 has a central cavity. Said central cavities in the upper portion 2 and the member 6, are for the purpose of receiving the steering post 7, which is a metal tube held in position in said cavity by a strap 8, the ends of which are secured by screws 9, to said front member 6 on each side of said steering post. A screw 11 screwed into said steering post and resting upon the upper edge of said strap 8 prevents the post from dropping, while permitting it to rotate in the bearing formed by the member 6 and the strap 8. Through the upper end of the steering post extends a steering bar 12 carrying on its ends steering handles 13. A pin 14, driven through a cap 16 and also through the central portion of said bar 12, prevents said bar from moving through said steering post.

The lower end of the steering post is secured in a hole in the center of a yoke 17, the sides of which extend on opposite sides of a front wheel 18 and carry at their lower ends a shaft 19 on which the front wheel rotates. Rear wheels 21 are fixedly secured to a tubular shaft 22, the ends of said shaft 22 being screwed into central portions of plates 23 and then swaged against said plates. Said plates are secured to the inner portions of the rear wheels 21 by means of screws 24, passing through holes in the ends of said plates and screwed into said wheels. Said rear shaft 22 rotates in bearings 26 in the ends of a yoke 27 having upwardly converging sides and a narrow central portion 28 which is received within the trough- or channel-shaped body 1 at its rear end and is pivotally secured by means of pins 29 upon the top 2 of the body portion.

A seat 31 is similarly secured to flanges 32 extending outwardly from the top of a seat post 33, which is of channel shaped form, the side members of said seat post having through their lower portion vertical series of registering holes 34. To receive the lower end of said post, there is provided a guide 36 depending slightly forward from a hole in said body portion 1, formed of a channel-shaped piece of sheet metal, the upper portion of which has flanges 35 extending outwardly therefrom secured by a spot-welding or otherwise to the under side of the central member 2 of the body portion. To sustain the post in any desired position, a bolt 37 extends through any pair of registering holes 34 in the sides of the post and also through holes in ears 38 formed integrally with the body portion and extending upwardly therefrom on opposite sides of the hole which receives the post. A nut 39 is screwed on said bolt after it has been passed through said holes.

Within the channel-shaped body portion, between the seat and the steering post, is pivoted, as shown at 40, the middle portion of a yoke 41, the sides of which contract at their lower ends and through holes in the lowermost portions of said sides extends a crank shaft 42, on the extreme ends of which are treadles 43. Each treadle is formed from a single rectangular piece of sheet metal, having terminal portions bent, first down, as shown at 44, and then upwardly, as shown at 45, to form ridges and free edges for engaging the soles of the shoes of the rider. Each treadle is secured upon the corresponding end of the crank shaft in the following manner. There are cut in each treadle two slits 46 extending in the longitudinal direction at a distance apart of about one-third of the width of the treadle, and the adjacent portions 47, 48, of the treadle are bent out from the plane of the treadle in rounded form in opposite directions. Strip-like portions 49 of the treadle at the innermost side thereof are also bent to form, with the adjacent portion of the treadle, a nearly complete ring to surround the end of the crank arm. After the treadles have been passed on the ends of the crank arms they are secured thereon by washers 51 on the reduced ends of the crank arms, being held in place by the extreme ends of the crank arms being swaged thereon.

To the crank shaft and to the rear shaft 22 are secured grooved pulleys 53, 54, by pins 57, driven therethrough and through said shafts. An endless band 58 passes around said pulleys, encircling each pulley so that the speed of the rear or driving shaft is double that of the crank shaft.

The distance of the crank shaft from the rear or driving shaft can be varied by means of a bolt 59, which extends through the central portion of a yoke 61 and the rear terminal portion 63 of a hanger 62. The yoke 61 extends rearwardly from its central portion and its ends are pivoted, as shown at 64, to the side of the yoke 41, while the hanger 62 is fixedly secured at its front end by spot-welding or otherwise, to the under side of the central portion 2 of the body. It then extends rearwardly and downwardly from said fixed portion and its rear terminal portion 63 is bent at right angles to said rearwardly extending portion and is apertured to receive the bolt 59, nuts 65 being screwed on said bolt and abutting against opposite sides of said terminal portion 63 to hold the bolt in any position to which it has been adjusted.

I claim:—

1. In a velocipede, the combination with a body, of a yoke secured to and extending downwardly therefrom, a wheel carrying shaft journaled in said yoke, a pulley on said shaft, a second yoke pivoted to said body, a second shaft journaled in said second yoke, a pulley on said second shaft, an endless member connecting said pulleys, means for rotating said second shaft, and means connected to the body and to said second yoke for effecting pivotal movement of the latter to adjust the tension of said endless member.

2. In a velocipede, the combination with a body, of a yoke secured to and extending downwardly therefrom, a wheel carrying shaft journaled in said yoke, a pulley on said shaft, a second yoke pivoted to said body, a second shaft journaled in said second yoke, a pulley on said second shaft, an endless member connecting said pulleys, means for rotating said second shaft, and means between said second yoke and the body pivotally connected with said second yoke and rigid with respect to the body for effecting pivotal movement of the second yoke to adjust the tension of said endless member.

3. In a velocipede the combination of a channel-shaped metal body, a yoke the central portion of which is secured within said body, the sides of said yoke diverging outwardly downward and the terminal portions of said yoke forming bearings, a rear shaft rotating in said bearings, wheels secured to said shaft, a grooved pulley secured to said shaft, a second yoke a central portion of which is pivotally secured on the inside of said body, the sides of said yoke converging downwardly and the lower ends of said sides forming bearings, means for rocking said second yoke upon its pivotal axis, means for locking said rocking means to any position to which it has been moved, a crank shaft extending through the bearings of the second yoke, treadles rotatably mounted on the ends of said crank shaft, a grooved pulley secured to said crank shaft between said bearings, and an endless band extending around said pulleys.

4. In a velocipede, the combination of a channel-shaped metal body, a yoke the central portion of which is secured within said body the sides of said yoke diverging outwardly downward and the terminal portions of said yoke forming bearings, a rear shaft rotating in said bearings, wheels secured to said shaft, a grooved pulley secured to said shaft, a second yoke a central portion of which is pivotally secured on the inside of said body, means carried by said second yoke and connected with said pulley for rotating said rear shaft, a third yoke the arms of which are pivotally attached to the arms of said second named yoke, a bolt extending through the central portion of said third-named yoke, a part fixed to said body through which said bolt also extends, and nuts screwed on said bolt on opposite sides of said fixed part.

GEO. EKLUND.